United States Patent [19]

Fossum

[11] Patent Number: 4,966,255
[45] Date of Patent: Oct. 30, 1990

[54] AUTOMATIC WEAR COMPENSATOR FOR ELECTROMAGNETIC BRAKE

[75] Inventor: Eric R. Fossum, Simsbury, Conn.

[73] Assignee: Reliance Electric Industrial Company, Greenville, S.C.

[21] Appl. No.: 272,556

[22] Filed: Nov. 16, 1988

[51] Int. Cl.$^5$ ............................................. F16D 65/52
[52] U.S. Cl. ..................... 188/71.8; 188/71.9; 188/171; 188/196 P
[58] Field of Search ............ 188/71.7, 71.9, 71.8, 188/171, 161, 196 R, 196 C, 196 F, 196 M, 196 B, 196 BA, 196 V, 196 P, 196 D; 192/74, 111 A, 111 R, 70.25

[56] References Cited

U.S. PATENT DOCUMENTS

| | | | |
|---|---|---|---|
| Re. 25,516 | 1/1964 | Jaeschke | 188/196 P |
| 3,467,227 | 9/1969 | Belart | 188/71.9 |
| 3,613,842 | 10/1971 | Pape | 188/71.8 |
| 3,624,763 | 11/1971 | Kroeger | 188/71.8 |
| 3,833,103 | 9/1974 | Stahle | 188/71.8 |
| 3,957,138 | 5/1976 | Kine | 188/196 F |
| 4,066,152 | 1/1978 | Pascal | 188/171 |
| 4,142,610 | 3/1979 | Alexander et al. | 188/171 |
| 4,323,143 | 4/1982 | Negishi | 188/71.9 |
| 4,326,616 | 4/1982 | Mochida et al. | 188/196 F |

Primary Examiner—Matthew C. Graham
Attorney, Agent, or Firm—McCormick, Paulding & Huber

[57] ABSTRACT

An electromagnetic motorbrake has three wear compensating studs with threaded portions that receive nuts. The threaded nuts define cylindrical wrap surfaces for spring clutch elements that are coupled between the armature and the pressure plate of the brake by a bellcrank to be sequentially wrapped to turn the nuts as required to automatically take up any excessive gap between the armature and the electromagnet due to wear of the friction disc between the armature and the pressure plate.

7 Claims, 2 Drawing Sheets

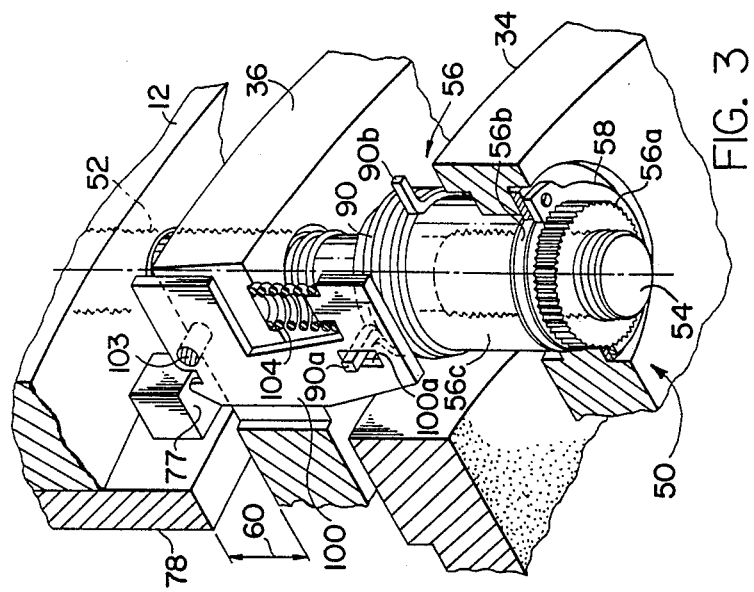
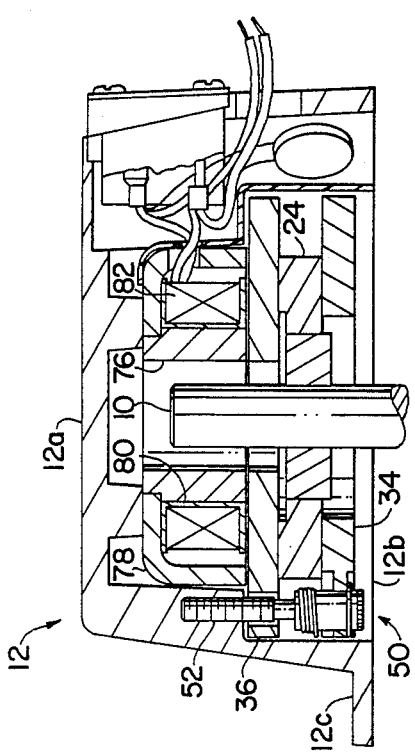
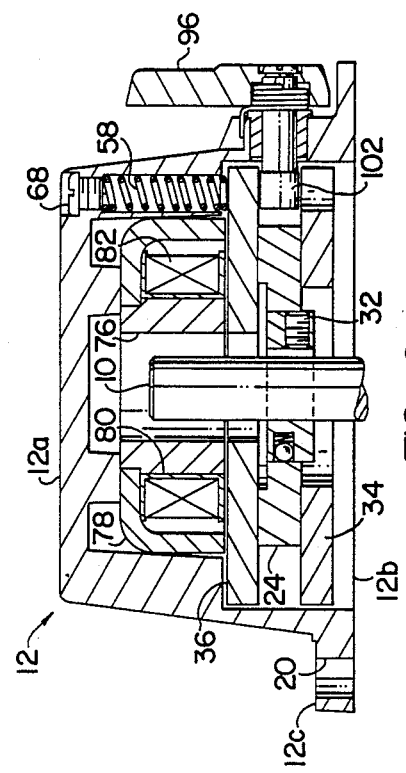

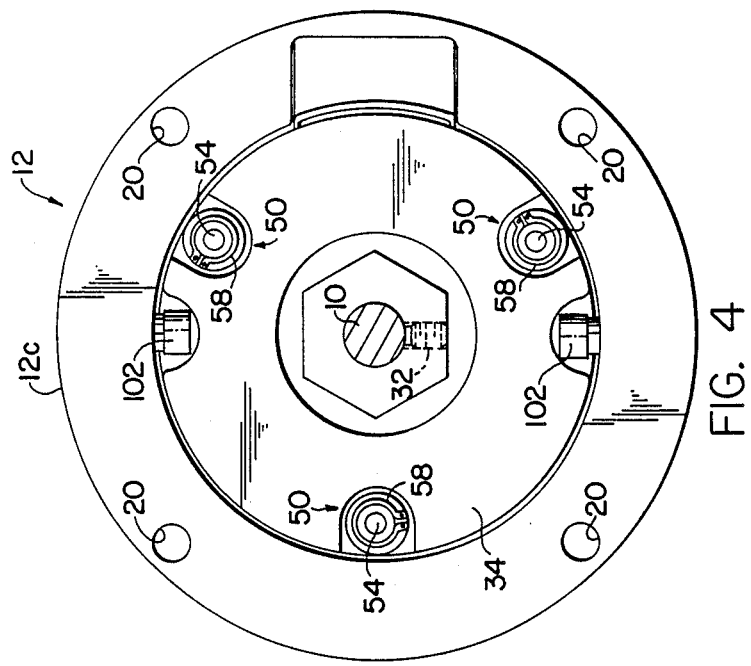

AUTOMATIC WEAR COMPENSATOR FOR ELECTROMAGNETIC BRAKE

BACKGROUND OF THE INVENTION

This invention relates generally to electromagnetically operated brakes for electric motors, and deals more particularly with an electromagnetically operated motor brake having an automatic adjustment for the gap provided between the electromagnetic pole piece and its associated armature to compensate for wear in the friction disc of the brake.

Electromagnetically operated motorbrakes generally include biasing means for urging an armature toward a pressure plate so as to prevent rotation of a brake disc that turns with the shaft of an electric motor, and an electromagnet is adapted to pull the armature toward the pole piece and away from the disc and pressure plate when energized.

One problem associated with motorbrakes of this type is that they require periodic readjustment to maintain a predetermined gap between the armature and the pole piece of the electromagnetic device. This gap can increase due to wear of the friction disc.

Automatic wear compensation devices have been installed on motorbrakes in an attempt to minimize or eliminate the requirement for periodic adjustments to maintain acceptable operating performance of motorbrakes of this type. One such device is illustrated in the German publication OS No. 2314483 dated Oct. 3, 1974 entitled solenoid released spring disc brake. In this German disclosure the spring loaded stationary brake armature disc is mounted between the solenoid housing and a friction disc rotating on the shaft, and there is a stationary reaction plate on the other side of the shaft disc. Bolts are mounted in the solenoid housing and armature, and protrude into bores in the reaction plate. The bores contain axially lockable devices securing the reaction plate in position in relation to the bolts, and are automatic in operation. The locking devices allow the reaction plate to move toward the solenoid body as wear of the friction disc must be taken up.

In another prior art U.S. Pat. No. 3,613,849 issued to Pape, an electromagnetic brake releasing device is disclosed that also has as automatic adjusting device designed to compensate for wear of the friction elements or pads. An armature is associated with a magnetic core to move toward and away from the friction elements or pads, and the adjusting device includes looking elements that permit the core to slide freely on guide bolts only toward the armature and toward the friction elements, and to slide toward the magnetic core only the distance of the armature stroke.

SUMMARY OF THE INVENTION

In accordance with the present invention an electrically energizable brake is adapted for use with a rotatable shaft, as for example a motor shaft, and electromagnetic means is provided in a fixed housing with an armature provided for movement in the housing toward and away from the electromagnetic device so as to release a friction disc provided between the armature and a fixed pressure plate. The friction disc is coupled to the rotating shaft and is free to rotate between the pressure plate and the armature only when the electromagnetic device is energized. Springs are provided to bias the armature toward the pressure plate and prevent rotation of the disc when the electromagnetic magnet is not energized. The pressure plate is mounted to the brake housing by three studs secured to the housing and having projecting portions that extend beyond the armature and in the direction of armature movement so that end portions of these studs can carry nuts that serve to locate the pressure plate in position relative to the armature. Each nut defines a spring clutch wrap cylinder surface and a spring clutch element is wrapped around this surface so as to achieve selective rotation of the nut on the threaded stud in order to automatically take up excessive space between the pressure plate and the electromagnetic caused by wear of the friction disc. Bellcrank means is provided for coupling one end of the spring clutch element to the armature so that sequential movement of the armature by the electromagnet means causes the spring clutch element to be so wrapped on its associated cylinder.

When the motorbrake has a proper air gap between the electromagnet and the armature these bellcranks are permitted to oscillate back and forth in radially oriented planes relative to the motor shaft axis. This oscillation is small until the friction disc shows signs of wear and the gap becomes excessive. As the travel of the armature increases these bellcranks oscillate through a larger angle and the spring clutch element or wrap spring, at least in one travel direction, slips rotationally on the nut with the result that on the next disengagement of the brake, caused by energizing the electromagnet, the spring grips the nut and turns it slightly on the threaded stud. This action, over repeated sequences of operation for the electromagnet, causes the three nuts to move axially on the threaded studs and automatically resets the air gap to its predetermined optimum value.

BRIEF DESCRIPTION OF THE DRAWINGS

FIG. 1 is a sectional view through a motorbrake constructed in accordance with the present invention and shows one of the three coupling means provided between the brake housing and the brake pressure plate.

FIG. 2 is a sectional view taken on a line oriented at right angles to the section line of FIG. 1 and illustrates the spring means for braking the shaft and manual cam operated means for manually releasing the brake.

FIG. 3 shows in perspective, and with portions broken away, one of the three coupling means provided between the brake housing and the pressure plate to achieve automatic compensation for wear in the friction disc.

FIG. 4 is a bottom plan view of the motor brake illustrated in FIGS. 1 and 2 illustrating the three circumaxially spaced locations for the coupling means provided between the brake housing and the pressure plate. Each of these coupling means as illustrated in FIG. 4 include each of the elements shown and described with reference to the perspective view of FIG. 3.

DETAILED DESCRIPTION

Turning now to the drawings in greater detail, and referring initially to FIG. 2, a motorbrake is shown for selectively braking the shaft 10 of an electric motor (not shown). The motorbrake includes a cup-shaped housing 12 having a closed end 12a and inner open end 12b. A peripherally extending flange 12c surrounds the housing 12 at the open end 12b and may include mounting holes 20 that are used to connect the housing to an associated electric motor housing (not shown) with which the brake is intended to be used. The housing 12 also includes fins for cooling (not shown) to increase the surface area for heat dissipation. The housing 12 generally comprises a cast aluminum material so as to provide increased strength, light weight, and good thermal transfer properties.

An annular friction disc or pad 24 of suitable friction material is provided on a hub structure. The hub structure includes a keyway for securing the hub structure and its associated friction disc to the shaft 10. Set screws 32 engages a key (not shown) provided in the keyway for this purpose.

The friction disc is mounted coaxially within the housing 12 on the shaft 10 as described, and also is provided between a pressure plate 34 and an annular armature 36. The pressure plate includes a surface for engaging the friction disc as does the armature 36, and a plurality of springs 58 act on the armature 36 to normally urge the armature into engagement with the friction disc and the friction disc into engagement with the pressure plate. Guide pins (not shown) pass through holes in the pressure plate and the armature to prevent relative rotational movement of the pressure plate relative to the armature during operation of the brake.

While the springs 58, 58 act to hold the brake in its engaged condition one or more manually operated levers 96 are provided for release of the brake. Lever 96 operates a cam 102 that provides a mechanical means for overcoming the force of the springs 58, 58 to disengage the motorbrake. If desired two such manually operated brake releasing levers 96 can be provided on a particular motorbrake depending upon the size of the motorbrake and the associated forces of the springs 58, 58. The force exerted by each spring 58 on the armature 36 can be adjusted by means of a screw 68 associated with each spring.

The motorbrake is adapted to be electrically disengaged from the normal brake set condition shown by energizing an electromagnetic coil 82 that is provided on a spool 80 located in the housing 12 and more particularly in a subassembly that includes an annular core or pole piece 76 and an outer wall 78. This core 76 and wall 78 cooperate with the armature 36 to define a flux path that will pull the armature toward the electromagnetic coil releasing the brake disc 24 and overcoming the forces of the springs 58, 58 referred to above as a consequence of energizing the electromagnetic coil.

The gap provided between the armature 36 and the adjacent face of core 76 and wall 78 must be closely adjusted for efficient operation of the electromagnetic device generally. Further an excessive gap can lead to excessive impact between the armature plate and the friction disc 24 and of the friction disc upon the pressure plate 34. This impact can be reduced if the velocities of these moving components is kept low by controlling this gap. With a proper gap shock and fractures of the friction disc or damage to other components of the motorbrake can be eliminated. This result is achieved by keeping the gap between the armature plate and the face of the pole piece or core 76 and wall 78 as referred to above at a predetermined dimension. In accordance with the present invention wear compensating means is provided between the pressure plate 34 and the housing 12 and more specifically between the pressure plate 34 and the annular core 76 and wall 78 that serve to define the release position of the brake (not shown).

FIG. 1 shows one of three such automatic compensating devices identified generally be reference 50. As shown each of these devices 50 includes a threaded stud 52 secured in the housing 12 of the motorbrake and each stud extends through an opening provided for it in the armature plate generally in the direction of armature movement. Each stud has a head portion that actually comprises a threaded nut on a threaded end portion of the stud and this head secures the pressure plate in a predetermined relationship to the housing 12 through an adjustable coupling mechanism to be described in greater detail with reference to FIG. 3.

Turning now to FIG. 3, the preferred form for a wear compensation device constructed in accordance with the present invention is shown at 50 and three such devices are provided around the generally circular brake assembly as referred to previously.

Still with reference to FIG. 3, the threaded stud 52 is secured in the housing 12 at its upper end, and the stud has a threaded lower end portion 54 that threadably receives a nut 56 of generally cylindrical exterior configuration, but with a knurled portion 56a at its lower end. The nut 56 also includes an annular groove 56b between the cylindrical portion 56c and the knurled nut portion 56a. This annular groove 56b is adapted to receive a generally U-shaped fastner element 58 so that the nut 56 can be secured in an opening provided for it in the pressure plate 34. As so constructed and arranged it will be apparent that the pressure plate 34 can be provided in predetermined relationship to the housing 12, and that the knurled nut will permit manual variations to be made to this predetermined spacing between the pressure plate 34 and the housing 12.

The housing 12 is fixed and supports the electromagnetic pole pieces 76 and 78 so as to define the gap 60 provided between the movable armature 36 and the fixed pole pieces where the brake is set and the electromagnet is not energized. More specifically, the gap is defined as a result of the springs 58 urging the armature 36 downwardly in FIG. 3 so as to provide a clamping action between the pressure plate 34 and the armature 36 on the friction disc 24. This gap 60 must be overcome by the electromagnet when energized to release the friction disc 24 from this clamp position. It is important that the gap 60 be maintained at a predetermined value for efficient operation of the electromagnet. Militating against this design criteria is the normal propensity of the friction disc 24 to wear, tending to increase this gap 60. In accordance with the present invention means is provided for coupling the pressure plate to the housing 12 and hence the pole pieces 76 and 78 so as to maintain this spacing 60 automatically as a result of cycially engergizing and deenergizing the electromagnet.

In accordance with the present invention the nut 56 defines a cylindrical spring clutch wrap surface 56c for the spring clutch element 90. The spring clutch element 90 comprises a coiled spring having opposite end portions 90a and 90b, one of which end portions 90a is received in a slot 100a defined by a bellcrank lever 100 that is pivotably supported for limited oscillatory motion on a pin 102 in the armature 36. Thus bellcrank lever 100 will be subject to oscillatory motion in a generally radially oriented plane relative to the center line or axis of the brake assembly as a result of sequentially energizing and deenergizing the electromagnet to release and reset the brake. A small spring 104 is provided between the armature and the free end portion of the bellcrank 100 to urge the bellcrank 100 toward the position shown, where the end portion or tang 90a of the spring element 90 is located in alignment with the pin 102 on which the bellcrank is mounted.

As so constructed and arranged energizing and deenergizing of the electromagnet will move the armature 36 from its clamped position (see FIGS. 1 and 2) to its released position where the armature is in contact with the pole pieces 76 and 78 closing the gap 60. The lever 100 preferably has the end opposite that engaged by return spring 104 adapted to contact a fixed stop surface defined by the housing or pole pieces (see 77 in FIG. 3). This engagement occurs at or slightly before the armature 36 closes this gap 60.

During normal operation, and prior to any excessive wear in the friction disc 24, the bellcrank lever 100 oscillates through a small angle and opening 100a in the lever 100 is narrow enough so that the spring tang 90a fits only loosely in the slot 100a with the result that the spring is not affected by such "normal" oscillations of the lever 100. When the air gap becomes excessive, however, the lever 100 oscillates through a larger angle with the result that the spring tang 90a is urged in alternative directions as a result of being engaged by the sides of the slot 100a. This action causes the spring 90 to altrnatively grip and slip on the nut outer cylindrical surface 56c. Such action on the nut leads to axial movement of the nut on the threaded stud 54 closing slightly the gap or space 60 provided between the face of pole piece 78 and armature 36.

I claim:

1. An electrically operable brake adapted for use with a rotatable shaft, comprising a brake housing, electromagnet means in said housing, an armature mounted for movement in the housing toward and away from the electromagnet means, a friction pad adjacent the armature, a pressure plate mounted adjacent the friction pad to provide a reaction surface for the pad and a predetermined spacing between the armature and the electromagnet means, pressure plate mounting means including at least one stud secured in said housing and having a projecting portion extending beyond the armature and in the direction of armature movement, said stud having a threaded end portion, a nut provided on said stud end portion, said nut serving to locate said pressure plate in position as aforesaid, a spring clutch wrap cylinder surface defined on said nut, a spring clutch element wrapped around said cylinder surface, and means coupling one end of said spring clutch element to said armature so that sequential movement of the armature by said electromagnet means can cause said spring clutch element to wrap tightly on said cylinder to rotate the nut and reposition the pressure plate and the friction pad and the armature relative said electromagnet means to compensate for wear of these components, said means coupling said spring clutch element to said armature comprising a bellcrank pivotably mounted to said armature and having an opening for receiving said one end of said spring clutch element.

2. The combination of claim 1 wherein a plurality of studs are secured in said housing, each stud having a nut and an associated spring clutch element wrapped thereon.

3. The combination of claim 2 wherein said means coupling said spring clutch elements to said armature comprises a plurality of bellcranks, each bellcrank pivotably mounted to said armature and having an opening for an associated spring one end.

4. The combination of claim 3 wherein each bellcrank includes a return spring acting between it and said armature to urge the bellcrank toward a normal position.

5. The combination of claim 3 wherein each said bellcrank pivots on an axis normal to the orientation of its associated stud.

6. The combination of claim 1 wherein said bellcrank lever has an abutment surface adapted to abut an abutment surface fixed in the housing and to pivot said bellcrank lever during closing of said predetermined spacing whereby said armature is repositioned to automatically compensate for wear of said friction pad.

7. The combination of claim 6 wherein said bellcrank includes a return spring acting between it and said armature to urge to bellcrank toward a normal position.

* * * * *